United States Patent
Ghanchi et al.

(10) Patent No.: US 12,330,696 B2
(45) Date of Patent: *Jun. 17, 2025

(54) ON-BOARD THERMAL TRACK MISALIGNMENT DETECTION SYSTEM AND METHOD THEREFOR

(71) Applicant: BNSF Railway Company, Fort Worth, TX (US)

(72) Inventors: Asim Ghanchi, Southlake, TX (US); Nicholas Dryer, North Barrington, IL (US); Coleman Barkley, Azle, TX (US); Michael Saied Saniei, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,223

(22) Filed: Feb. 20, 2024

(65) Prior Publication Data

US 2024/0190483 A1 Jun. 13, 2024

Related U.S. Application Data

(63) Continuation of application No. 18/185,923, filed on Mar. 17, 2023, now Pat. No. 11,915,404, which is a (Continued)

(51) Int. Cl.
*B61K 9/08* (2006.01)
*B61L 23/04* (2006.01)
(Continued)

(52) U.S. Cl.
CPC .............. *B61K 9/08* (2013.01); *B61L 23/042* (2013.01); *B61L 23/047* (2013.01);
(Continued)

(58) Field of Classification Search
CPC ....... B61K 9/08; B61L 23/042; B61L 23/047; B61L 25/025; B61L 2205/04; G60T 7/0002; H04N 23/90; H04N 23/54
See application file for complete search history.

(56) References Cited

U.S. PATENT DOCUMENTS 9,340,219 B2 5/2016 Gamache et al.
9,796,400 B2 10/2017 Puttagunta et al.
(Continued)

OTHER PUBLICATIONS

Lu et al., Rolling-stock Automatic In-situ Line Deterioration and Operating Condition Sensing, Jan. 17, 2013.
(Continued)

*Primary Examiner* — Michael J Zanelli
(74) *Attorney, Agent, or Firm* — Whitaker Chalk Swindle & Schwartz PLLC; Enrique Sanchez, Jr.; Juan Vasquez

(57) ABSTRACT

An on-board thermal track misalignment detection system method therefor is presented. The system can use on-board locomotive sensors attached to an end-of-train device to detect (on the edge), signs and symptoms of thermal misalignments of the track. Once detected an alert can be transmitted to prevent potential derailments. The system can also include a forward-facing and rearward-facing imaging sensors (e.g., camera, LiDAR sensor, etc). The system can wirelessly communicate (e.g., via radio) with a leading locomotive to ensure proper air pressure and location. The system can be powered by an on-board battery and/or air pressure device. Advantageously, the system can calculate whether any rail deviation is significant (e.g., via one or more threshold values). The system can also leverage image processing functionality, executed by one or more processors) to find the centerline and the distance between the tracks.

19 Claims, 6 Drawing Sheets

Related U.S. Application Data continuation of application No. 17/806,316, filed on Jun. 10, 2022, now Pat. No. 11,623,669.

(51) Int. Cl.
  *B61L 25/02* (2006.01)
  *G06T 7/00* (2017.01)
  *H04N 23/54* (2023.01)
  *H04N 23/90* (2023.01)

(52) U.S. Cl.
  CPC .......... *B61L 25/025* (2013.01); *G06T 7/0002* (2013.01); *H04N 23/90* (2023.01); *B61L 2205/04* (2013.01); *H04N 23/54* (2023.01)

(56) References Cited

U.S. PATENT DOCUMENTS

| | | | |
|---|---|---|---|
| 9,981,673 B2 | 5/2018 | Martin et al. | |
| 10,713,503 B2 | 7/2020 | Thakkar et al. | |
| 11,022,982 B2 | 6/2021 | Naithani et al. | |
| 2015/0268172 A1 | 9/2015 | Naithani et al. | |
| 2017/0227470 A1 | 8/2017 | Cesarano | |
| 2018/0339720 A1* | 11/2018 | Singh | G06T 7/001 |
| 2019/0054937 A1 | 2/2019 | Graetz et al. | |
| 2020/0143173 A1 | 5/2020 | Kurz et al. | |
| 2020/0207389 A1 | 7/2020 | Moth et al. | |
| 2020/0158656 A1 | 8/2020 | Chung et al. | |
| 2021/0078622 A1 | 3/2021 | Miller et al. | |
| 2023/0112991 A1 | 4/2023 | Wang et al. | |

OTHER PUBLICATIONS

Hong, Train Track Misalignment Detection System, May 31, 2014.
Ravishankar et al.; Detecting Defects of Railway Tracks by Using Computer Vision Methodology; Proceedings of the 2021 IISE Annual Conference; 2021; pp. 572-577 (Year: 2021).
Mittal et al.; Vision Based Railway Track Monitoring Using Deep learning; arXiv preprint arXic;1711.06423 (2017).
International Patent Application No. PCT/US2023/016843 International Search Report and Written Opinion, Jul. 12, 2023, 15 Pages.

* cited by examiner

ON-BOARD THERMAL TRACK MISALIGNMENT DETECTION SYSTEM AND METHOD THEREFOR

CROSS-REFERENCE TO RELATED APPLICATIONS

The present application is a Continuation of U.S. patent application Ser. No. 18/185,923, filed Mar. 17, 2023, which is a Continuation of U.S. patent application Ser. No. 17/806,316, filed Jun. 10, 2022, the entirety of which is hereby incorporated by reference for all purposes.

TECHNICAL FIELD

The present disclosure generally relates to track alignment detection, and more particularly to on-board thermal track misalignment detection systems.

BACKGROUND

There are approximately 1200-1400 train starts per day. Thermal misalignments (also referred to as Track Buckles or Sun Kinks) are an often-catastrophic failure of rail infrastructure (e.g., the roadbed of railroad tracks). These events often cause significant damage and have resulted in fatalities. Since 2019, there have been roughly $26 million in FRA reportable track buckle derailments. Track buckles are caused by thermal expansion of the rail, along with softer, less rigid roadbeds. Often a first train over the area will cause the soft roadbed to give way, however the extra weight will often keep the track together enough for the initial train to pass. After the initial train passes the roadbed will deform immediately after train clears, leaving deformed track behind. As such, most of the track buckling happens after a first train passes. Rail infrastructure has a very uniform factor and will generally always fit a known scheme for safe travel of trains. Track Buckles do not fit this uniformity.

SUMMARY

The present disclosure achieves technical advantages as an on-board thermal track misalignment detection system method therefor. The system can use on-board locomotive sensors operably coupled to an end-of-train device to detect (on the edge), signs and symptoms of thermal misalignments of the track. Once detected an alert can be transmitted to prevent potential derailments. In one embodiment, an End-of-Train Device (ETD) can be installed on every train. ETDs can be a self-powering system applied to all trains that do not operate with disrupted power (e.g., rear locomotives). The ETD can be a compact device similar to an ETD LiDAR sensor. The LiDAR sensors can use light ranging and reflection to generate 3-D terrestrial data with a high degree of accuracy. LiDAR sensors are quickly lowering in price and ruggedized into a solid-state package for greater reliability. The system can also include a forward-facing and rearward-facing imaging sensor (e.g., camera, LiDAR sensor, etc.). The system can wirelessly communicate (e.g., via radio) with a leading locomotive to ensure proper air pressure and location. The system can be powered by an on-board battery and/or air pressure.

Advantageously, the system can calculate whether the deviation between tracks has a significant deviation (e.g., via one or more threshold values). The system can also leverage image processing functionality, executed by one or more processors) to find the centerline and the distance between the tracks. These calculations can be made as soon as a train passes over a section of track. Such image processing and calculations can occur via an edge processor—a processor proximate the imaging sensor. Edge processing can determine a "good" and "non-conforming" criteria (Anomaly Detection), with a faster detection time and lower infrastructure cost than wayside computing. The system can perform detection of track buckles by use of a rear-facing sensor system (imaging sensor and edge-computing device) in conjunction with existing ETD as an optional power source.

It is an object of the invention to provide a thermal railroad track misalignment detection system. These and other objects are provided by at least the following embodiments.

In one embodiment, a thermal railroad track misalignment detection system can include: an on-board locomotive sensor configured to generate an image of railroad track rails; an on-board processor operably coupled to the camera and configured to: analyze the image to determine the centerline between the rails; calculate the distance between the rails; and determine, using one or more thresholds, if the deviation between rails has a significant deviation. Further comprising, generating a notification indicating that there is a significant deviation. Further comprising, detecting on the edge, signs and symptoms of thermal misalignments of the rails.

BRIEF DESCRIPTION OF THE DRAWINGS

The present disclosure will be readily understood by the following detailed description, taken in conjunction with the accompanying drawings that illustrate, by way of example, the principles of the present disclosure. The drawings illustrate the design and utility of one or more exemplary embodiments of the present disclosure, in which like elements are referred to by like reference numbers or symbols. The objects and elements in the drawings are not necessarily drawn to scale, proportion, or precise positional relationship. Instead, emphasis is focused on illustrating the principles of the present disclosure.

DETAILED DESCRIPTION

The disclosure presented in the following written description and the various features and advantageous details thereof, are explained more fully with reference to the non-limiting examples included in the accompanying drawings and as detailed in the description, which follow. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can visualize or recognize the members of the genus. Accordingly, these examples should not be construed as limiting the scope of the claims.

Figure 1:
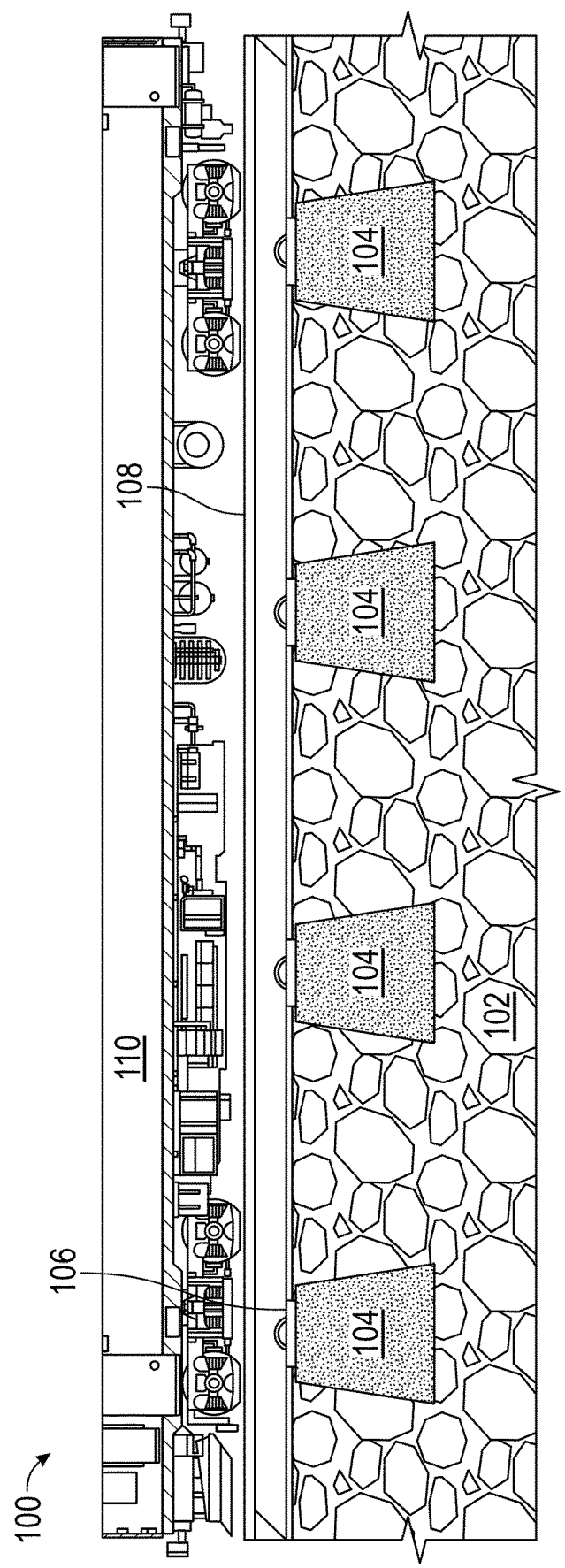
FIG. 1 is a cross-sectional view of a traditional rail infrastructure with a train, in accordance with one or more exemplary embodiments of the present disclosure.

FIG. 1 is a cross-sectional view of a traditional rail infrastructure with a train, generally referred to as 100, in accordance with one or more exemplary embodiments of the present disclosure. Traditional rail infrastructure can include ballast 102, anchor 104, rail tie 106, and a rail 108. A train 110 can travel along the rails 108. The structure of a railroad track system generally holds all the elements in place so a train 110 can travel. However, when heat is applied the railroad track system, the steel of the rails 108 wants to expand but they the ballast 102, the ties 106, and the anchors 104 hold the rails 108 in place. Even a degree or two temperature change allows the expansion stress to push back out and then flex outward, but actual temperature fluctuations can be generally between 20 to 40 degrees above ambient temperature. So, once the rail infrastructure breaks down, it is easy for the rail 108 to expand. Typically, break down can occur when a train travels over the track. As a first train traverses a track, it disturbs the ballast 102. The ballast 102 is generally rock or gravel having a jagged shape. The jagged shapes allow the ballast 102 to interlock with each other. But over time, the ballast 102 becomes rounded off and the track loses its structural rigidity. The ballast 102 can become rounded due to low level vibration as a train traverses the rails 108 over ballast 102. As the structural rigidity decreases, the track infrastructure can no longer balance the expansion forces and the anchors 104 begin to shift, thereby allowing the track rails 108 to buckle, warp, and generally misalign.

Figure 2A:
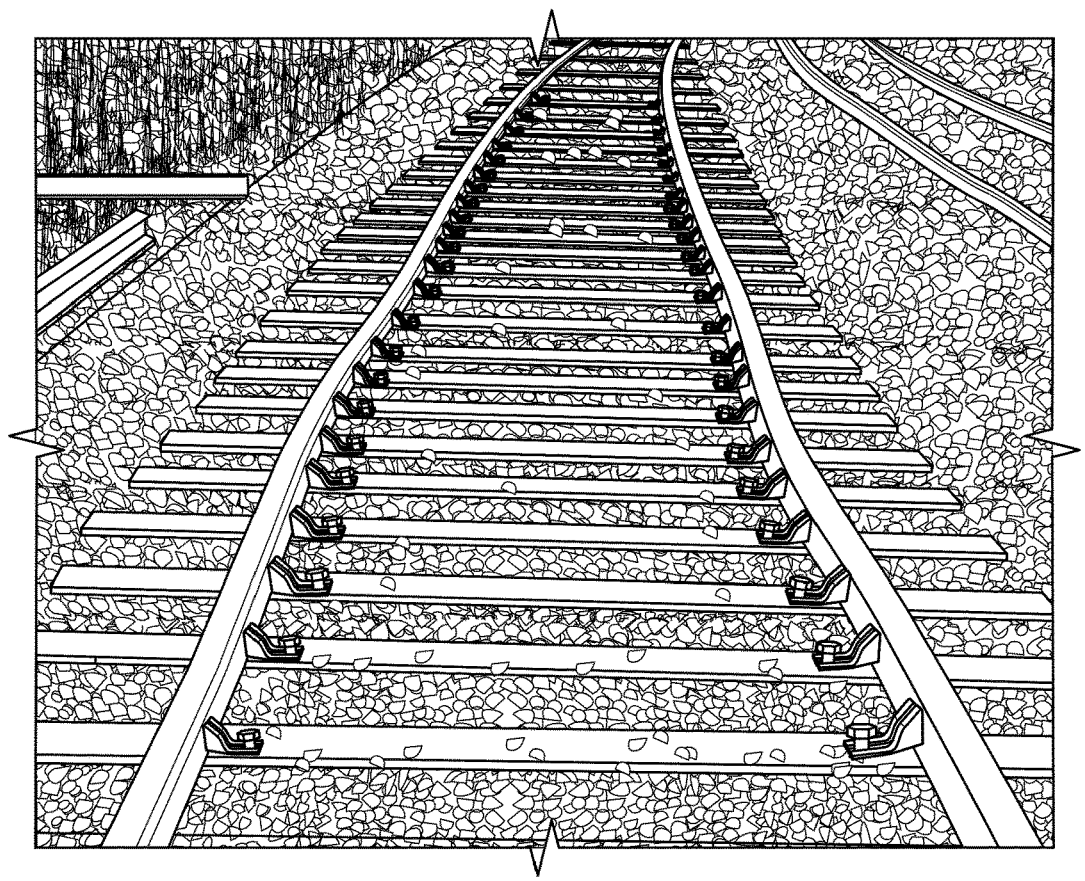
FIGS. 2A and 2B are perspective views of rail thermal misalignments, in accordance with one or more exemplary embodiments of the present disclosure.
Figure 2B:
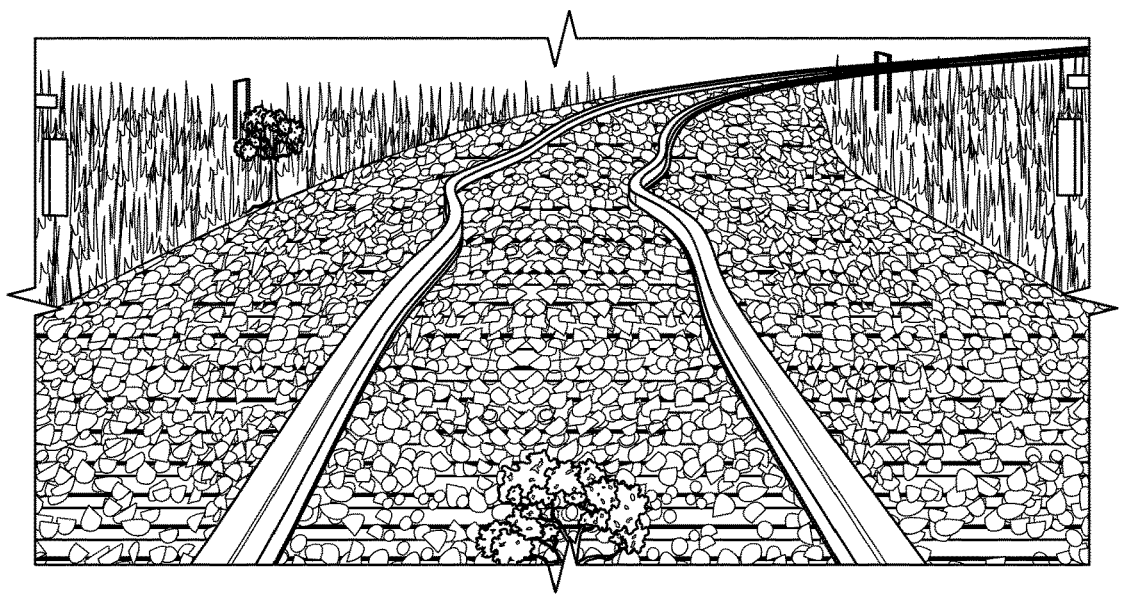

FIGS. 2A and 2B are perspective views of rail thermal misalignments, in accordance with one or more exemplary embodiments of the present disclosure. When the rail infrastructure is no longer a rigid structure, it can buckle out even more so. FIG. 2A shows a rail buckle event that may be large enough for a train to derail. FIG. 2B shows a rail buckle event that is large enough for a train to derail.

Figure 3:
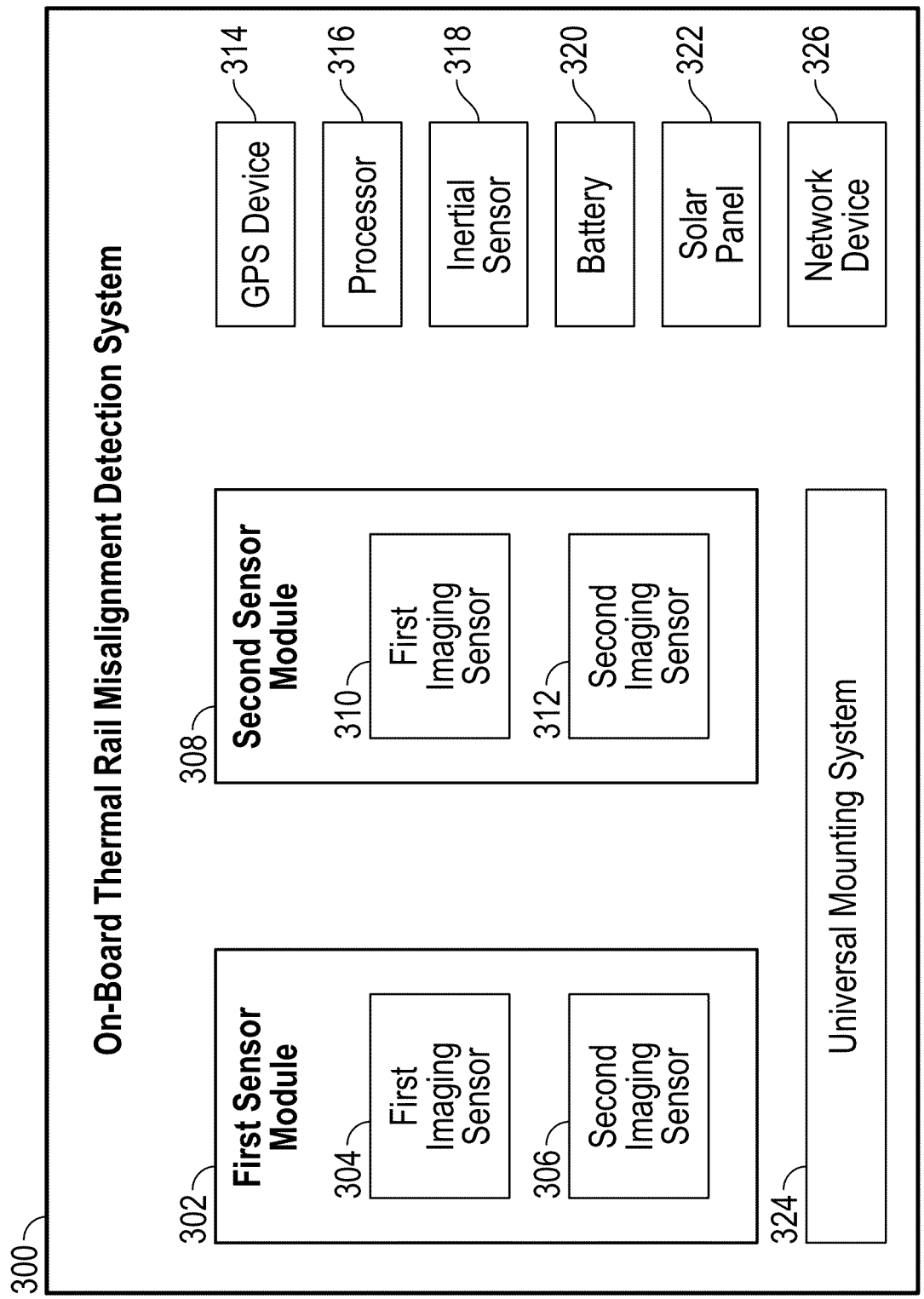
FIG. 3 is a schematic view of an on-board thermal rail misalignment system, in accordance with one or more exemplary embodiments of the present disclosure.

FIG. 3 is a schematic view of an on-board thermal rail misalignment system 300, in accordance with one or more exemplary embodiments of the present disclosure. The on-board thermal rail misalignment system 300 can include one or more components, such as a first sensor module 302, having a first imaging sensor 304 and a second imaging sensor 306, a second sensor module 308, having a first imaging sensor 310 and a second imaging sensor 312, a GPS device 314, a processor 316, an inertial sensor 318, a battery 320, a solar panel 322, a universal mounting system 324, and a network device 326, among others.

In one embodiment, the first sensor module 302 can include a housing configured to position a plurality of imaging sensors to view a first rail at different angles. For example, the first imaging sensor 304 can be positioned to view the first rail at a first angle below parallel to the first rail and the second imaging sensor 306 can be positioned to view the first rail at a second angle below parallel to the first rail. In another embodiment, the first imaging sensor 304 and the second imaging sensor 306 of the first sensor module 302 can be positioned vertically to allow for a greater field of view of the first rail. In another embodiment, the imaging sensors 304 and 306 can be cameras, LiDAR sensors, RADAR sensors, ultrasonic sensors, acoustic sensors, or other suitable sensor type or combination thereof. In another embodiment, the second sensor module 308 can include a housing configured to position a plurality of imaging sensors to view a second rail at different angles. For example, the first imaging sensor 310 can be positioned to view the second rail at a first angle below parallel to the second rail and the second imaging sensor 312 can be positioned to view the second rail at a second angle below parallel to the second rail. In another embodiment, the first imaging sensor 310 and the second imaging sensor 312 of the second sensor module 308 can be positioned vertically to allow for a greater field of view of the second rail. In another embodiment, the imaging sensors 310 and 312 can be cameras, LiDAR sensors, RADAR sensors, ultrasonic sensors, acoustic sensors, or other suitable sensor type, or combination thereof. In another embodiment, more than two imaging sensors can be positioned vertically at different viewing angles. In another embodiment the imaging sensors 304, 306, 310, and 312 are solid-state sensors. In another example, the image sensors can generate imaging data. For example, the imaging data can include one or more images relate to the rails generated by cameras, one or more point-clouds related to the rails generated by LiDAR sensors, etc. The point-clouds can represent one or more railroad infrastructure elements. In another embodiment, the housing can include an Inertial Measurement Unit (IMU) and a processing unit.

In one embodiment, the system 314 can include a GPS device 314. In another embodiment, the GPS device 314 can be disposed within the first sensor module 302, the second sensor module 308, or both. For example, the GPS device 314 can receive one or more satellite signals to determine the position of the GPS device. In another embodiment the GPS device 314 can be a high precision GPS device, such as a GPS receiver with real time kinematics (RTK) correction.

In one embodiment, the system 300 can include one or more processor(s) 316 operably coupled to memory. Memory can comprise electronic storage that can include non-transitory storage media that electronically stores information. The electronic storage media of electronic storage can include one or both of system storage that can be provided integrally (e.g., substantially non-removable) with processors 316 and/or removable storage that can be removably connectable to processors 316 via, for example, a port (e.g., a USB port, a firewire port, etc.) or a drive (e.g., a disk drive, etc.). Electronic storage may include one or more of optically-readable storage media (e.g., optical disks, etc.), magnetically-readable storage media (e.g., magnetic tape, magnetic hard drive, floppy drive, etc.), electrical-charge-based storage media (e.g., EEPROM, RAM, etc.), solid-state storage media (e.g., flash drive, etc.), and/or other electronically-readable storage media. Electronic storage may include one or more virtual storage resources (e.g., cloud storage, a virtual private network, and/or other virtual storage resources). The electronic storage can include a database, or public or private distributed ledger (e.g., blockchain). Electronic storage can store machine-readable instructions, software algorithms, control logic, data generated by processor(s), data received from server(s), data received from computing platform(s), and/or other data that can enable server(s) to function as described herein. The electronic storage can also include third-party databases accessible via a network.

Processor(s) 316 can be configured to provide data processing capabilities in server(s) 102. As such, processor(s) 316 can include one or more of a digital processor, an analog processor, a digital circuit designed to process information, an analog circuit designed to process information, a state machine, and/or other mechanisms for electronically processing information, such as FPGAs, ASICs, Raspberry Pi, controllers, or other suitable devices. The processor(s) 316 can be a single entity or include a plurality of processing units. These processing units can be physically located within the same device, or processor(s) 316 can represent processing functionality of a plurality of devices or software functionality operating alone, or in concert.

The processor(s) 316 can be configured to execute machine-readable instructions or machine learning modules via software, hardware, firmware, some combination of software, hardware, and/or firmware, and/or other mechanisms for configuring processing capabilities on processor(s) 316. As used herein, the term "machine-readable instructions" can refer to any component or set of components that perform the functionality attributed to the machine-readable instructions component. This can include one or more physical processors 316 during execution of processor-readable instructions, the processor-readable instructions, circuitry, hardware, storage media, or any other components.

The processor(s) 316 can be configured with machine-readable instructions having one or more functional modules. The machine-readable instructions can be implemented on one or more processors 316 with access to memory. The machine-readable instructions can be a single networked node, or a machine cluster, which can include a distributed architecture of a plurality of networked nodes. The machine-readable instructions can include control logic for implementing various functionality, as described in more detail below. The machine-readable instructions can include certain functionality associated with the system 300. Additionally, the machine-readable instructions can include a smart contract or multi-signature contract that can process, read, and write data to the database, distributed ledger, or blockchain.

Advantageously, the processor 316 can be an edge processor disposed proximate the first and second imaging sensors to provide real time (sub-second) processing of generated data. The processor 316 can be a Raspberry Pi or Arduino kind of processor. For example, tracj geometries are well understood and when captured data (e.g., LiDAR point clouds, images, etc.) no longer meet the expected geometry, a device on the edge can quickly process, e.g., the LiDAR data generated to make those determinations. Although the processor 316 can be any type of processor, an edge processor can provide processing at the location where the detection is needed, thereby mitigating the requirement to transfer the generated data from the point of generation to a centralized location (e.g., the cloud, a data center, etc.) and increasing throughput without having to worry about bandwidth. By disposing the processing power at the edge (proximate the sensor data generation) smaller analytic determination payloads can be transmitted instead of the relatively larger generated data payloads, allowing for binary indications (yes/no type answers, alarms, etc.) to some other location.

In one embodiment, the system 300 can include a network device 326 to provide connectivity to a network. The network device can include a transceiver for wireless communication, as well as one or more ports for wired communication. The aforementioned system components can be communicably coupled to each other via a network, such that data can be transmitted. The network can be a system bus, the Internet, intranet, cellular, or other suitable network. The data transmission can be encrypted, unencrypted, over a VPN tunnel, or other suitable communication means. The network can be a WAN, LAN, PAN, or other suitable network type. The network communication between any system component can be encrypted using PGP, Blowfish, Twofish, AES, 3DES, HTTPS, or other suitable encryption. The system 300 can be configured to provide communication via the various systems, components, and modules disclosed herein via an application programming interface (API), PCI, PCI-Express, ANSI-X12, Ethernet, Cellular, Wi-Fi, Bluetooth, or other suitable communication protocol or medium. The system 300 can provide two-way communication of data between the networked components, via one or more libraries, programs, protocols (e.g., FTP, sFTP, etc.), or APIs (e.g., HTTP Live Streaming (HLS), Web Real-Time Communication (WebRTC), HTTP Dynamic Streaming (HDS), MPEG-DASH, etc.). Additionally, third party systems and databases can be operably coupled to the system components via the network.

In one embodiment, the system 300 can include an inertial sensor 318 to provide inertial monitoring. For example, as the train traverses the train tracks, the system 300 and its components will experience vibrations and movement (e.g., bumps, braking, etc.) that should be monitored to compensate for that shifting movement in the processing data to normalize the processing data. In another embodiment, the inertial sensor 318 can be an inertial navigation system (INS) that can integrate accelerometers, gyroscopes, and other sensors with global positioning systems (GPS/GNSS) and other location references to provide estimation of an object's position, velocity, heading, and orientation in space.

In one embodiment, the system 300 can include a battery 320. For example, the battery 320 can be an alkaline, nickel metal hydride (NIMH), or lithium-ion battery, among others. The battery 320 can also be rechargeable or charged via a train-based power supply. The battery 320 can be disposed in the housing and operably coupled to the components of the system 300 to provide power to one or more system 300 components and receive power from one or more system components (e.g., solar panel 322). In another embodiment, the system 300 can be powered via an existing train poser supply (e.g., a device that can generate its own power based on air pressure or an existing train power outlet, among others).

In one embodiment, the system 300 can include a solar panel 322. For example, the solar panel 322 can be a monocrystalline, polycrystalline, or thin film (amorphous) solar panel, among others. The solar panel can be removable, collapsible, positionable, or any combination thereof. The solar panel 322 can be operably coupled to the housing. For example, one or more articulable arms can positionally couple the solar panel 322 to the housing. The solar panel 322 can also be disposed to one or more faces of the housing. The solar panel 322 can be operably coupled to one or more components of the system 300 to provide power to one or more of the system 300 components (e.g., component operation or battery 320 charging).

In one embodiment, the system 300 can include a universal mounting system 324 to couple the system 300 to a rail vehicle. For example, the universal mounting system can include brackets, vices, magnets, braces, or other suitable mechanisms to secure the system 300 to the rail vehicle. The universal mounting system 324 can be removable. For example, a single person can attach and reattach the on-board thermal rail misalignment detection system 300 to the end of a rail vehicle 402. In practice, any rail vehicle 402 can theoretically end up being the last car in a train. it doesn't matter any type of rail vehicle, the system 300 could be mounted onto it using the universal mounting system 324 removably coupled to the rear of any rail vehicle 402.

Figure 4:
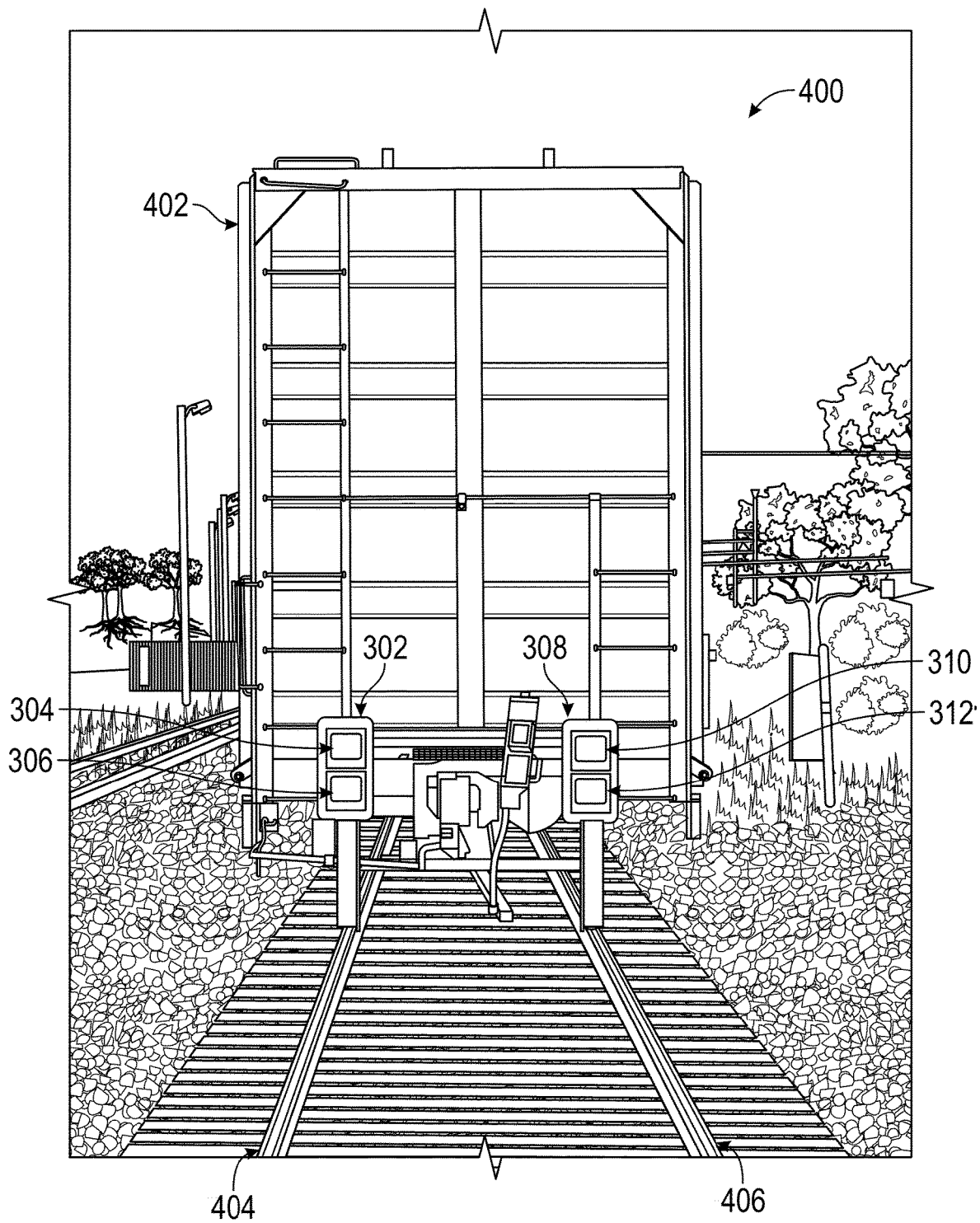
FIG. 4 is a perspective view of an on-board thermal rail misalignment system disposed at the rear of the train, in accordance with one or more exemplary embodiments of the present disclosure.

FIG. 4 is a perspective view of an on-board thermal rail misalignment system disposed proximate the rear of a train, generally referenced as 400, in accordance with one or more exemplary embodiments of the present disclosure. As a rail vehicle 402 (e.g., a rail car, among others) traverses a railroad track having a first rail 404 and a second rail 406, the system 400 can include one or more first and second imaging sensors directed toward one or more rails (or portions thereof) of the railroad track.

In one embodiment, a first sensor module 302 can be operably coupled to a rail vehicle 402. The first sensor module 302 can include a first imaging sensor 304 and a second imaging sensor 306. The first sensor module 302 can be disposed proximate a first wheel of the rail vehicle 402 to have a first rail view of the first rail 404. For example, the first field of view can be centered such that the first rail 404 bisects the first rail view. The first sensor module 302 can also be disposed at any location proximate the rear of the rail vehicle 402 and positioned to have a first rail view showing at least a portion of the first rail 404. The first rail view can be equally bisected by the first rail 404 or bisected with any other suitable bisection proportion.

In one embodiment, a second sensor module 308 can be operably coupled to a rail vehicle 402. The second sensor module 308 can include a first imaging sensor 310 and a second imaging sensor 312. The second sensor module 308 can be disposed proximate a second wheel of the rail vehicle 402 to have a second rail view of the second rail 406. For example, the second view can be centered such that the second rail 406 bisects the second rail view. The second sensor module 308 can also be disposed at any location proximate the rear of the rail vehicle 402 and positioned to have a second rail view showing at least a portion of the first rail 404. The second rail view can be equally bisected by the second rail 406 or bisected with any other suitable bisection proportion.

Accordingly, as the rail vehicle traverses the railroad tracks, the first sensor module 302 can acquire one or more images or video of sections of the first rail 404 within the first rail view and the second sensor module 308 can acquire one or more images or video of sections of the second rail 404 within the first rail view.

Figure 5:
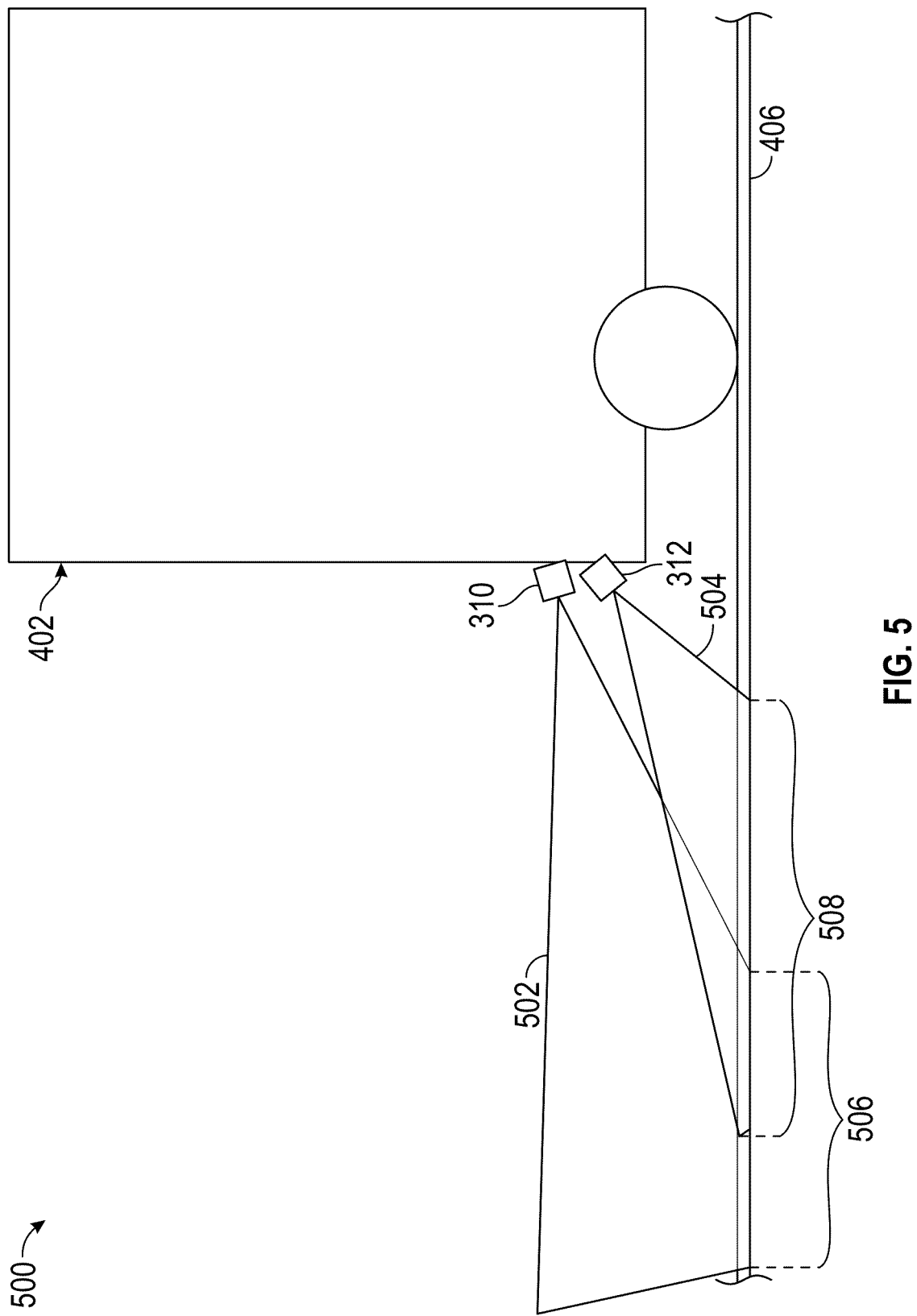
FIG. 5 is a schematic side-view of an on-board thermal rail misalignment system, in accordance with one or more exemplary embodiments of the present disclosure.

FIG. 5 is a schematic side-view of an on-board thermal rail misalignment system, generally referenced as 500, in accordance with one or more exemplary embodiments of the present disclosure. The first imaging sensor 310 can be positioned to have a first second rail view 502 for a first section 506 of the second rail 406. The second imaging sensor 312 can be positioned to have a second second rail view 504 for a second section 508 of the second rail 406. The first imaging sensor 310 and the second imaging sensor 312 can be positioned within the first sensor module (not shown for clarity) to selectively determine the first second rail view 502 and the second second rail view 504. In another embodiment, the first imaging sensors 304, 310 can be positioned parallel to the rails 404, 406 and the second imaging sensors 306, 312, can be canted 30-40 degrees downward from parallel. One or more of the sensors can be canted toward a rail. The first second rail view 502 and the second second rail view 504 can at least partially overlap such that at least a portion of the first section 506 and the second section 508 of the second rail 406 can be seen by both the first imaging sensor 310 and the second imaging sensor 312. Due to the side view of FIG. 5, this description refers to the second sensor module and its components, however, the principles disclosed herein are equally applicable to the first sensor module 302 and its components and any additional sensor modules that can be added to the system 300. In one embodiment, in order to have two test points for a rail, a first imaging sensor 304 and a second imaging sensor 306 can be positioned to capture data related to the first rail 404.

In operation, as images, point clouds, or videos are acquired by the on-board thermal rail misalignment detection system as the rail vehicle traverses the railroad tracks, the on-board edge processor can analyze the acquired images for track alignments. A majority of track buckle derailments occur on tangent track. As such the data captured by the first and second sensor modules 302, 308 of the first and second rails 404, 406 can determine if the track deviates from uniform. In one embodiment, the system 300 can use the imaging data to determine the centerline between the first rail 404 and the second rail 406. For example, the centerline between two rails can be calculated by determining the distance between the two rails and dividing the distance by two. In another embodiment, the deviation can be determined by comparing the distance between the rails 404, 406 with a previously determined distance between the rails 404, 406. In another embodiment, the deviation can be determined by comparing the distance between the rails 404, 406 to the centerline with a previously determined distance between the rails 404, 406 and the centerline. In the case of tangent (straight) track any deviation from straight should be below an anomaly threshold to ensure safe track. The track behind a rail vehicle 402 should be straight to identify any curvature that would not be negotiable for the speed of the train. For example, if a train is traveling 79 mph there should not be a six- or four-degree curve behind the rail vehicle. Traveling at 79 miles an hour, the system 300 may detect a 1½-degree curve behind the rail vehicle 402, but such a curve could be below the anomaly threshold and thus be safe or travel. if you start getting into higher degree of curvature that is an anomaly. The system can take into account the speed of the train as the system 300 is generating these measurements via edge detection using an index of what the speed for that track is rated. In one scenario, a articular section of track may be rated for 79 mph travel, but due to excess traffic on a route, a train on that particular section may be traveling at 40 mph. Each section of track can have associated with it a speed index that would be the acceptable curvature for speed. The system 300 can access a timetable database having the track ratings that can be accessible by the processor 316. As such, the anomaly threshold can be an adaptive threshold taking into account the speed index for a section of track and the measured deviation from center of a rail.

The system 300 can calculate if the deviation between tracks has a significant deviation. The system 300 can also find the center line and the distance between the rails of tracks. These calculations can be made as the rail vehicle traverses a section of track and can generate and send a notification (if needed). The system 300 can incorporate data from the inertial sensor 318 to normalize the generated data prior to comparison to remove any variations due to the data generation itself (e.g., bumps, braking, etc.) In one embodiment, the system 300 can compare two or more data sets generated by the first and second imaging sensors 304, 306, 310, 312, or other suitable device in real-time. For example, the data sets can be images, LiDAR point clouds, video segments, or other suitable data. In another embodiment, the generated LiDAR point clouds can be overlaid to determine any differences and the magnitude of any differences for a section of track. If the differences surpass an adaptive anomaly threshold (based at least on rail deviation from center and the speed index), the system 300 can generate an alert identifying the section of track (using the GPS device 314 data) and transmit the alert to one or more recipients.

Figure 6:
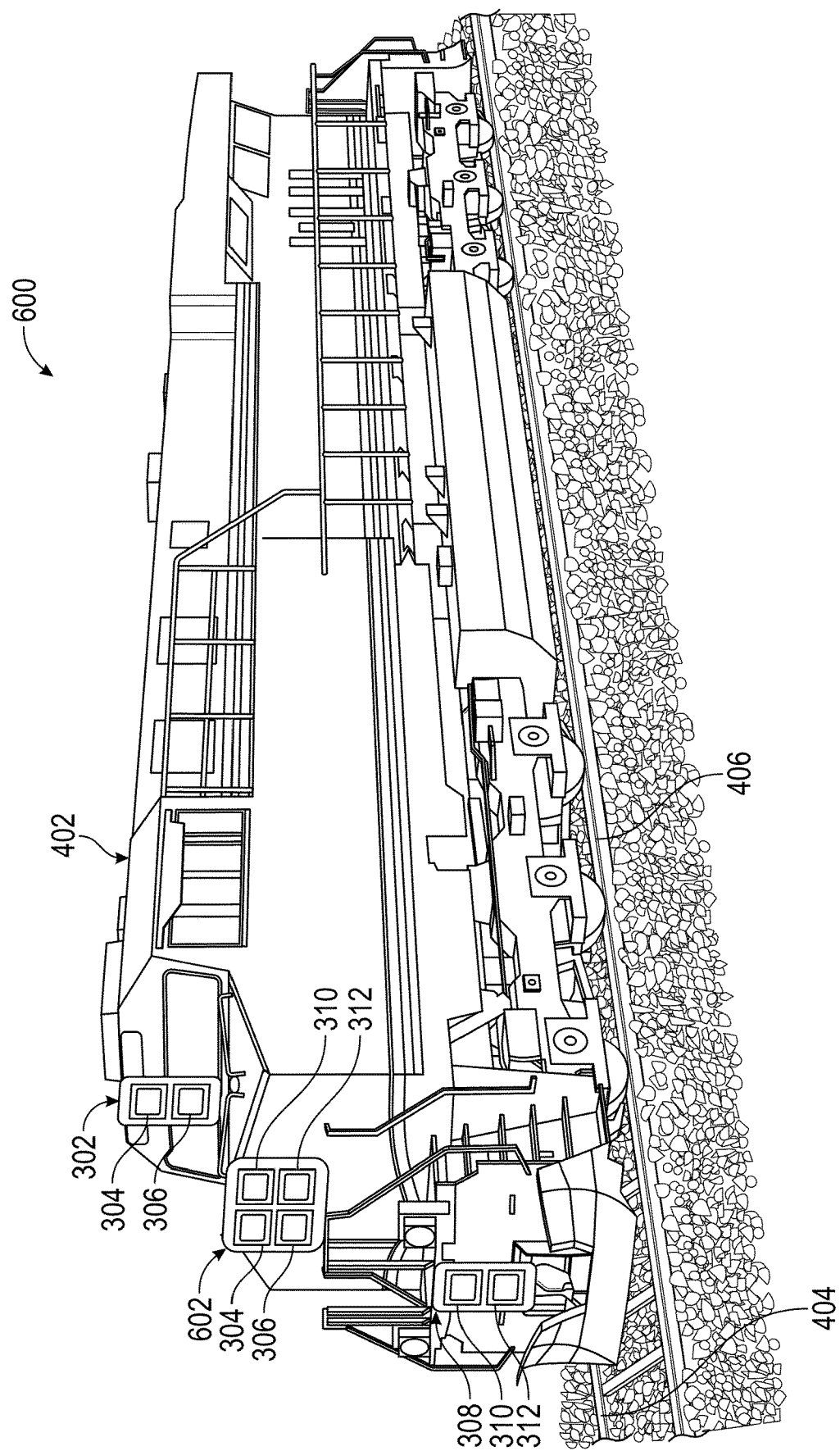
FIG. 6 is a perspective view of an on-board thermal rail misalignment system disposed at the front of the train, in accordance with one or more exemplary embodiments of the present disclosure.

FIG. 6 is a perspective view of an on-board thermal rail misalignment system disposed proximate the front of a train, generally referenced as 600, in accordance with one or more exemplary embodiments of the present disclosure. As a rail vehicle 402 (e.g., a locomotive, among others) traverses a railroad track having a first rail 404 and a second rail 406, the system 600 can include one or more first and second imaging sensors directed toward one or more rails (or portions thereof) of the railroad track.

In one embodiment, a first sensor module 302 can be operably coupled to a rail vehicle 402, disposed proximate the front of a train. The first sensor module 302 can include a first imaging sensor 304 and a second imaging sensor 306. The first sensor module 302 can be disposed at a first height of the rail vehicle 402 to have a first rail view of the first rail 404. For example, the first field of view can be centered such that the first rail 404 and the second rail 406 are at least partially in the first rail view. The first sensor module 302 can also be disposed at any location proximate the rear of the rail vehicle 402 and positioned to have a first rail view showing at least a portion of the first rail 404. The first rail view can be equally bisected by the first rail 404 or bisected with any other suitable bisection proportion.

In one embodiment, a second sensor module 308 can be operably coupled to a rail vehicle 402, disposed proximate the front of a train. The second sensor module 308 can include a first imaging sensor 310 and a second imaging sensor 312. The second sensor module 308 can be disposed at a second height of the rail vehicle 402 to have a second rail view of at least a portion of the second rail 406. For example, the second view can be centered such that the second rail 406 and the first rail 404 are at least partially in the second rail view. The second sensor module 308 can also be disposed at any location proximate the rear of the rail vehicle 402 and positioned to have a second rail view showing at least a portion of the first rail 404. The second rail view can be equally bisected by the second rail 406 or bisected with any other suitable bisection proportion. Accordingly, as the rail vehicle traverses the railroad tracks, the first sensor module 302 can acquire one or more images or video of sections of at least the first rail 404 within the first rail view and the second sensor module 308 can acquire one or more images or video of sections of at least the second rail 404 within the first rail view. The different heights can provide different views of the first and second rails.

In another embodiment, a third sensor module 602 can be operably coupled to a rail vehicle 402, disposed proximate the front of a train. The third sensor module 602 can include first imaging sensors 304, 310, second imaging sensors 306, 312. The third sensor module 602 can be disposed at a third height of the rail vehicle 402 to have first and second rail views of at least a portion of the first rail 404 and the second rail 406. For example, the first view can be centered such that the first rail 404 and the second rail 406 are at least partially in the first and second rail views. The first view can be centered such that the first rail 404 is at least partially in the first rail view. The second view can be centered such that the second rail 406 is at least partially in the second rail view. The third sensor module 308 can also be disposed at any location proximate the front of the rail vehicle 402. The first imaging sensor 304 and the second imaging sensor 306 can be directed toward the first rail 404. The first imaging sensor 310 and the second imaging sensor 312 can be directed toward the second rail 406. The first rail view can be equally bisected by the first rail 404 or bisected with any other suitable bisection proportion. The second rail view can be equally bisected by the second rail 406 or bisected with any other suitable bisection proportion. Accordingly, as the rail vehicle 402 traverses the railroad tracks, the third sensor module 602 can acquire one or more images or video of sections of at least the first rail 404 within the first rail view and the second rail 404 within the first rail view. In another embodiment, the imaging sensors 304, 306, 310, 312 can be canted laterally to obtain views of different rails. For example, first imaging sensors 304, 310 can be canted toward the first rail 404 and second imaging sensors 306, 312 can be canted toward the second rail 406. In another embodiment, the imaging sensors 304, 306, 310, 312 can be canted vertically to obtain different views of a particular rail.

Persons skilled in the art will readily understand that advantages and objectives described above would not be possible without the particular combination of computer hardware and other structural components and mechanisms assembled in this inventive system and described herein. Additionally, the algorithms, methods, and processes disclosed herein improve and transform any general-purpose computer or processor disclosed in this specification and drawings into a special purpose computer programmed to perform the disclosed algorithms, methods, and processes to achieve the aforementioned functionality, advantages, and objectives. It will be further understood that a variety of programming tools, known to persons skilled in the art, are available for generating and implementing the features and operations described in the foregoing. Moreover, the particular choice of programming tool(s) may be governed by the specific objectives and constraints placed on the implementation selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

The disclosure may be embodied in other specific forms without departing from the spirit or essential characteristics thereof. For example, each of the new structures described herein, may be modified to suit particular variations or requirements while retaining their basic configurations or structural relationships with each other or while performing the same or similar functions described herein. The present embodiments are therefore to be considered in all respects as illustrative and not restrictive. Accordingly, the scope of the inventions can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A method of detecting railroad track misalignment, comprising:
receiving, via a first imaging sensor coupled to a rail vehicle, a first rail view of a first section of a first rail;
generating first imaging data related to the first rail via the first imaging sensor;
receiving, via a second imaging sensor coupled to a rail vehicle, a second rail view of a second section of the first rail;
generating second imaging data related to the first rail via the second imaging sensor; and
comparing, via an edge processor, the first and second imaging data to detect misalignments of a railroad track, wherein an adaptive anomaly threshold varies based upon a measured deviation of the rail.

2. The method of claim 1, wherein the measured deviation is calculated by the edge processor using a distance between the first rail and a second rail.

3. The method of claim 1, wherein the measured deviation is calculated by the edge processor using a distance between the first rail and a centerline between rails.

4. The method of claim 1, further comprising a GPS device operably coupled to the edge processor and configured to receive one or more satellite signals to determine the position of the rail vehicle.

5. The method of claim 4, wherein the edge processor can determine a speed index for a particular section of track using the rail vehicle position.

6. The method of claim 5, wherein an adaptive anomaly threshold varies based upon the speed index of the rail vehicle location.

7. The method of claim 1, wherein the first imaging sensor and the second imaging sensor can be positioned within a first sensor module to selectively determine the first rail view and the second rail view.

8. The method of claim 7, wherein the first imaging sensor is positioned parallel to the first rail.

9. The method of claim 7, wherein the second imaging sensor is positioned canted downward from parallel to the first rail.

10. The method of claim 7, further comprising:
receiving, via a third imaging sensor coupled to the rail vehicle, a third rail view of a first section of a second rail;
generating third imaging data related to the second rail via the third imaging sensor;
receiving, via a fourth imaging sensor coupled to the rail vehicle, a fourth rail view of a second section of the second rail; and
generating fourth imaging data related to the second rail via the fourth imaging sensor.

11. The method of claim 10, wherein the edge processor is disposed proximate the first, second, third, and fourth imaging sensors and configured to receive and compare the third and fourth imaging data to determine whether any differences between the third and fourth imaging data exceed an adaptive anomaly threshold.

12. The method of claim 10, wherein the third imaging sensor and the fourth imaging sensor can be positioned within a second sensor module to selectively determine the third rail view and the fourth rail view.

13. The method of claim 10, wherein the first imaging sensor is positioned parallel to the first rail.

14. The method of claim 10, wherein the second imaging sensor is positioned canted downward from parallel to the first rail.

15. The method of claim 1, further comprising generating an alert identifying a section of misaligned railroad track and transmitting the alert to one or more recipients.

16. A method of detecting railroad track misalignments via a railroad track misalignment system, comprising:
receiving, via a first imaging sensor coupled to a rail vehicle, a first rail view of a first section of a first rail;
generating first imaging data related to the first rail via the first imaging sensor;
receiving, via a second imaging sensor coupled to a rail vehicle, a second rail view of a second section of the first rail;
generating second imaging data related to the first rail via the second imaging sensor; and
generating inertial sensor data, via an inertial sensor, related to a railcar's vibration or movement;
removing, via an edge processor, the railcar's vibration or movement from the first, second, third, and fourth imaging data using the inertial sensor data; and
comparing, via the edge processor, the first and second or the third and fourth imaging data to detect railroad track misalignments.

17. The method of claim 16, further comprising a solar panel or battery operably coupled to the system and configured to provide power to one or more components.

18. The method of claim 16, wherein the edge processor compares two or more data sets generated by the first and second imaging sensors in real-time.

19. The method of claim 16, further comprising generating an alert identifying a section of misaligned railroad track and transmitting the alert to one or more recipients.

* * * * *